United States Patent
Ghosh et al.

(10) Patent No.: US 12,550,047 B2
(45) Date of Patent: Feb. 10, 2026

(54) SYSTEMS AND METHODS OF NARROWBAND DISCOVERY FOR WIRELESS DEVICES

(71) Applicant: Meta Platforms Technologies, LLC, Menlo Park, CA (US)

(72) Inventors: Chittabrata Ghosh, Fremont, CA (US); Carlos Horacio Aldana, Mountain View, CA (US); Kangjin Yoon, Menlo Park, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 648 days.

(21) Appl. No.: 17/871,477

(22) Filed: Jul. 22, 2022

(65) Prior Publication Data
US 2023/0073116 A1 Mar. 9, 2023

Related U.S. Application Data

(60) Provisional application No. 63/236,300, filed on Aug. 24, 2021.

(51) Int. Cl.
*H04W 48/10* (2009.01)
*H04W 48/16* (2009.01)

(52) U.S. Cl.
CPC ........... *H04W 48/10* (2013.01); *H04W 48/16* (2013.01)

(58) Field of Classification Search
CPC .............................. H04W 48/10; H04W 48/16
See application file for complete search history.

(56) References Cited

U.S. PATENT DOCUMENTS

| | | | | |
|---|---|---|---|---|
| 9,716,992 | B2* | 7/2017 | Abraham | H04W 8/005 |
| 10,088,393 | B2* | 10/2018 | Dehaven | G01N 1/2035 |
| 10,349,364 | B1* | 7/2019 | Lambert | H04W 84/18 |
| 10,586,617 | B1* | 3/2020 | McNair | G16H 50/30 |
| 10,715,210 | B1* | 7/2020 | Liu | H04B 1/7136 |
| 2010/0130203 | A1* | 5/2010 | Fallon | H04W 92/045 |
| | | | | 455/435.1 |
| 2012/0022948 | A1* | 1/2012 | Jones | H04L 67/75 |
| | | | | 705/14.64 |

(Continued)

FOREIGN PATENT DOCUMENTS

| | | |
|---|---|---|
| EP | 2342930 A1 | 7/2011 |
| EP | 3026943 A1 | 6/2016 |
| TW | 201251487 A | 12/2012 |

OTHER PUBLICATIONS

International Search report and Written Opinion for International Application No. PCT/US2022/041421, mailed Dec. 14, 2022, 12 pages.

*Primary Examiner* — Dominic E Rego
(74) *Attorney, Agent, or Firm* — Foley & Lardner LLP

(57) ABSTRACT

Systems, methods, and computer readable medium for performing narrowband device discovery include a first ultra-wideband (UWB) device that transitions from a first narrowband channel to a second narrowband channel of a plurality of defined narrowband channels, to broadcast a discovery beacon for receipt by one or more UWB devices. The first UWB device can receive, from a second UWB device, in the second narrowband channel, a request for at least one service to be performed between the first UWB device and the second UWB device. The first UWB device can send to the second UWB device in response to the request, a response frame.

20 Claims, 11 Drawing Sheets

(56) References Cited

U.S. PATENT DOCUMENTS

| | | | |
|---|---|---|---|
| 2013/0148545 A1* | 6/2013 | Jung | H04W 48/16 370/255 |
| 2015/0117318 A1* | 4/2015 | Qi | H04W 76/18 370/329 |
| 2015/0351018 A1* | 12/2015 | Kim | H04W 48/16 370/338 |
| 2015/0358481 A1* | 12/2015 | Nagata | H04W 4/46 370/312 |
| 2016/0021560 A1* | 1/2016 | Reshef | H04W 84/12 370/338 |
| 2016/0095147 A1 | 3/2016 | Kim et al. | |
| 2016/0255473 A1* | 9/2016 | Abraham | H04W 24/04 370/328 |
| 2016/0285630 A1* | 9/2016 | Abraham | H04L 65/611 |
| 2016/0323901 A1* | 11/2016 | Yum | H04W 72/542 |
| 2017/0019735 A1* | 1/2017 | Song | H04S 7/301 |
| 2017/0280377 A1* | 9/2017 | Patil | H04W 48/16 |
| 2018/0014341 A1* | 1/2018 | Jung | H04W 56/002 |
| 2018/0060529 A1* | 3/2018 | Crothall | G16H 40/67 |
| 2019/0320407 A1* | 10/2019 | Goyal | H04L 41/5058 |
| 2020/0015043 A1* | 1/2020 | Patil | H04W 4/06 |
| 2020/0204656 A1* | 6/2020 | Lee | H04L 69/24 |
| 2020/0322872 A1* | 10/2020 | Jung | H04W 56/00 |
| 2020/0389869 A1* | 12/2020 | Patil | H04L 63/0823 |
| 2021/0051462 A1* | 2/2021 | Choi | H04W 76/15 |
| 2021/0127244 A1* | 4/2021 | Choi | H04W 84/18 |
| 2021/0127431 A1* | 4/2021 | Kim | H04W 4/80 |
| 2021/0211959 A1* | 7/2021 | Nakagawa | H04W 36/10 |
| 2021/0235255 A1* | 7/2021 | Ansari | H04W 76/14 |
| 2021/0243685 A1* | 8/2021 | Tachibana | H04W 76/10 |
| 2022/0069885 A1* | 3/2022 | Nissilä | H04B 7/0604 |
| 2022/0078636 A1* | 3/2022 | Sugaya | H04W 16/18 |

\* cited by examiner

SYSTEMS AND METHODS OF NARROWBAND DISCOVERY FOR WIRELESS DEVICES

CROSS-REFERENCE TO RELATED APPLICATION

The present disclosure claims the benefit of and priority to U.S. Provisional Application No. 63/236,300, filed on Aug. 24, 2021, the disclosure of which is hereby incorporated by reference in its entirety for all purposes.

BACKGROUND

Artificial reality such as virtual reality (VR), augmented reality (AR), or mixed reality (MR) provides immersive experience to a user. Typically, in systems and methods which implement or otherwise provide immersive experiences, such systems utilize Wi-Fi, Bluetooth, or other radio wireless links to transmit/receive data. However, using such wireless links typically requires detailed coordination between links, particularly where multiple devices in the same environment are utilizing the same wireless link technology for communications.

SUMMARY

Systems, methods, and computer readable medium for performing narrowband device discovery include a first ultra-wideband (UWB) device that transitions from a first narrowband channel to a second narrowband channel of a plurality of defined narrowband channels, to broadcast a discovery beacon for receipt by one or more UWB devices. The first UWB device can receive, from a second UWB device, in the second narrowband channel, a request for at least one service to be performed between the first UWB device and the second UWB device. The first UWB device an send to the second UWB device in response to the request, a response frame.

In some embodiments, the first UWB device broadcasts the discovery beacon after transitioning to the second narrowband channel. The first UWB device may receive, from the second UWB device, the request in response to the second UWB device detecting the discovery beacon in the second narrowband channel. In some embodiments, the response frame includes at least one of an acceptance, a modification, or a rejection of the request for the at least one service. In some embodiments, at least one of the request or the response frame comprise an indication of one or more channels for performing the at least one service between the first UWB device and the second UWB device. In some embodiments, the one or more channels comprise at least one of a first channel for performing ranging, or a second channel for performing data communications. In some embodiments, the discovery beacon includes a time synchronization function, and wherein the second UWB device synchronizes one or more clocks of the second UWB device according to the time synchronization function.

In some embodiments, the first UWB device establishes at least one of a controller role for the first UWB device, or a controlee role for the second UWB device. In some embodiments, the first UWB device establishes a cluster of devices including the second UWB device, according to one or more attributes of the second UWB device. In some embodiments, the first UWB device indicates, in the response frame, a time or duration to perform the at least one service. The first UWB device may cause, via the response frame, the second UWB device to operate in a sleep or low power mode over a period of time, prior to the time or duration to perform the at least one service. In some embodiments, the discovery beacon includes a hopping pattern of the first UWB device with respect to the plurality of defined narrowband channels.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are embodiments related to devices operating in the ultra-wideband (UWB) spectrum. In various embodiments, UWB devices operate in the 3-10 GHz unlicensed spectrum using 500+ MHz channels which may require low power for transmission. For example, the transmit power spectral density (PSD) for some devices may be limited to −41.3 dBm/MHz. On the other hand, UWB may have transmit PSD values in the range of −5 to +5 dBm/MHz range, averaged over 1 ms, with a peak power limit of 0 dBm in a given 50 MHz band. Using simple modulation and spread spectrum, UWB devices may achieve reasonable resistance to Wi-Fi and Bluetooth interference (as well as resistance to interference with other UWB devices within a shared or common environment) for very low data rates (e.g., 10 s to 100 s Kbps) and may have large processing gains. However, for higher data rates (e.g., several Mbps), the processing gains may not be sufficient to overcome co-channel interference from Wi-Fi or Bluetooth. According to the embodiments described herein, the systems and methods described herein may operate in frequency bands that do not overlap with Wi-Fi and Bluetooth, but may have good global availability based on regulatory requirements. Since regulatory requirements make the 7-8 GHz spectrum the most widely available globally (and Wi-Fi is not present in this spectrum), the 7-8 GHz spectrum may operate satisfactory both based on co-channel interference and processing gains.

Some implementations of UWB may focus on precision ranging, security, and low to moderate rate data communication. As UWB employs relatively simple modulation, it may be implemented at low cost and low power consumption. In AR/VR applications, link budget calculations for an AR/VR controller link indicate that the systems and methods described herein may be configured for effective data throughput ranging from ~2 to 31 Mbps (e.g., with 31 Mbps being the maximum possible rate in the latest 802.15.4z standard), which may depend on body loss assumptions. Using conservative body loss assumptions, the systems and methods described herein should be configured for data throughput of up to approximately 5 Mbps, which may be sufficient to meet the data throughput performance standards for AR/VR links. With a customized implementation, data throughput rate could be increased beyond 27 Mbps (e.g., to 54 Mbps), but with possible loss in link margin. Various applications, use cases, and further implementations of the systems and methods described herein are described in greater detail below.

Figure 1:
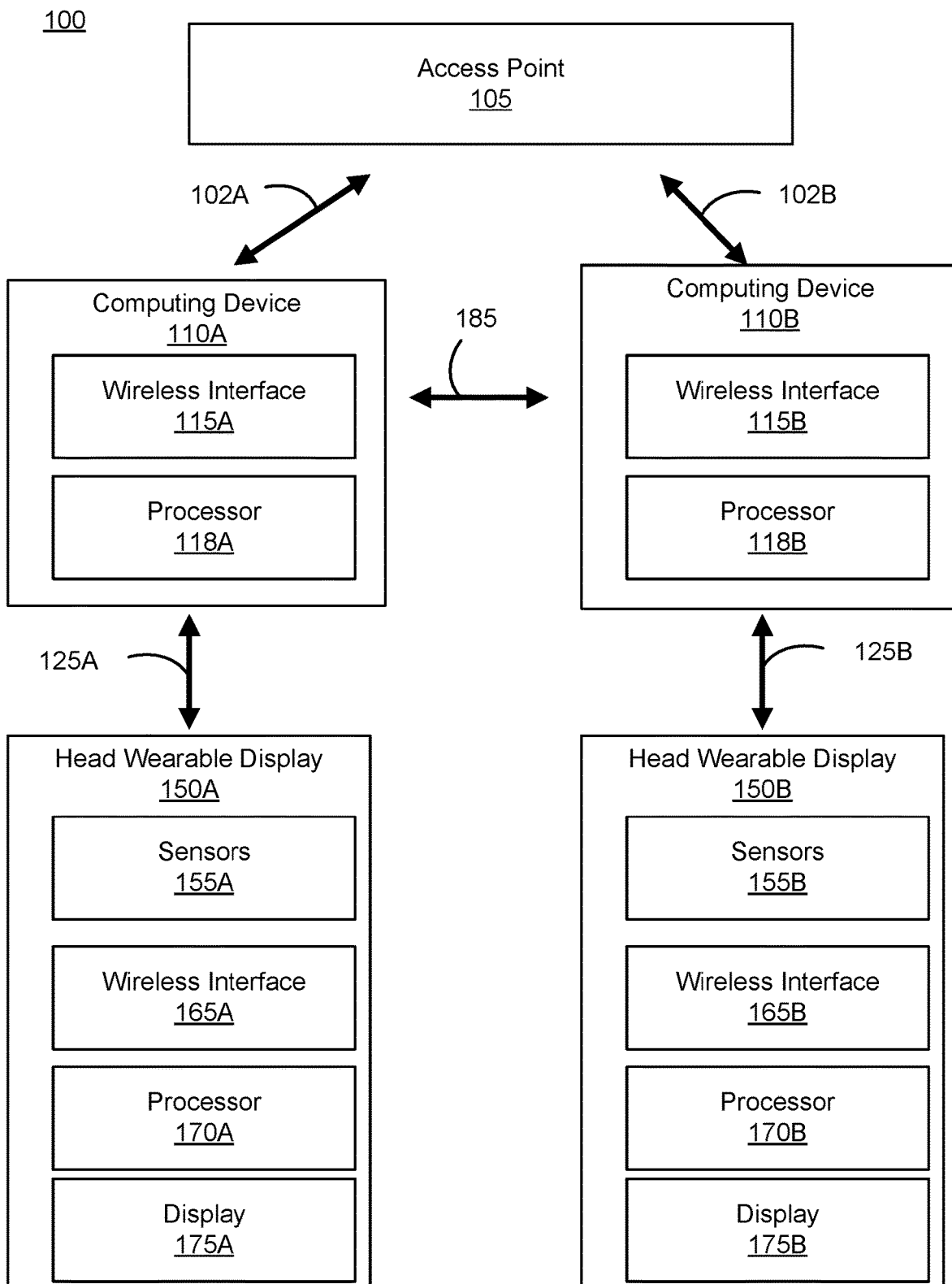
FIG. 1 is a diagram of a system environment including an artificial reality system, according to an example implementation of the present disclosure.
Figure 2:
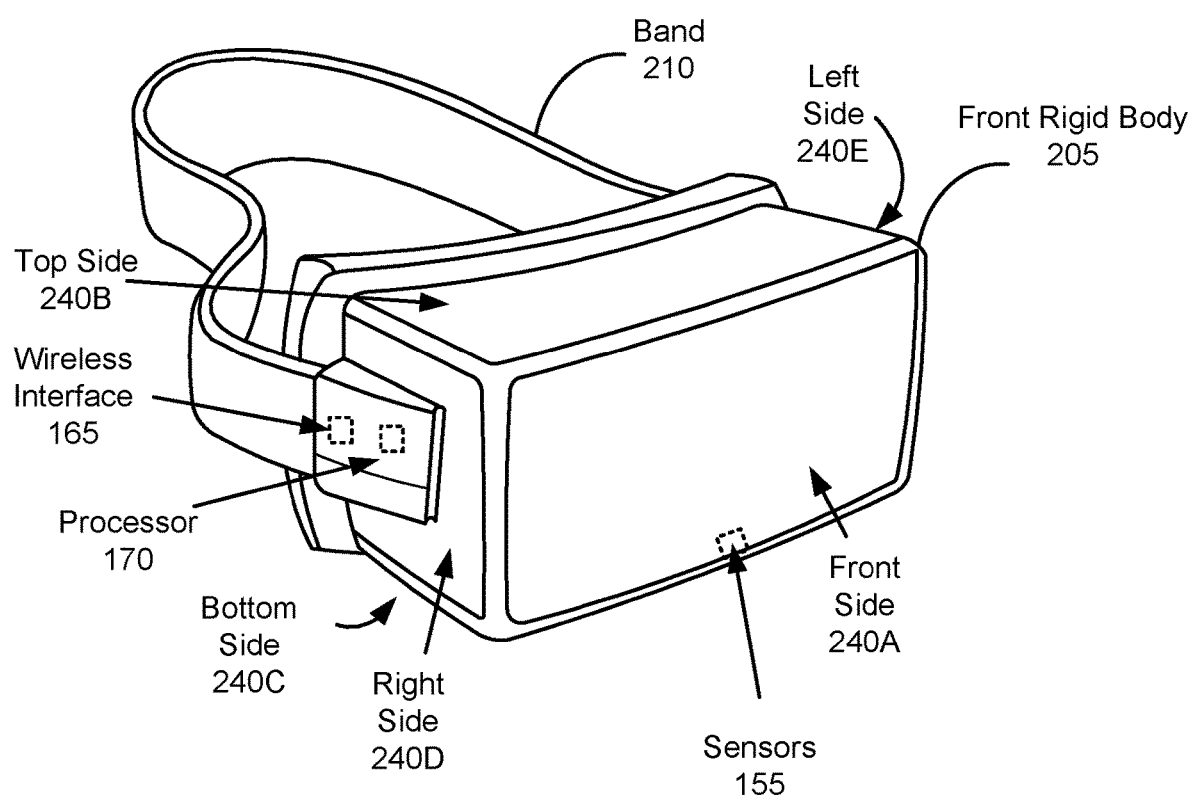
FIG. 2 is a diagram of a head wearable display, according to an example implementation of the present disclosure.

FIG. 1 is a block diagram of an example artificial reality system environment 100. In some embodiments, the artificial reality system environment 100 includes an access point (AP) 105, one or more HWDs 150 (e.g., HWD 150A, 150B), and one or more computing devices 110 (computing devices 110A, 110B; sometimes referred to as consoles) providing data for artificial reality to the one or more HWDs 150. The access point 105 may be a router or any network device allowing one or more computing devices 110 and/or one or more HWDs 150 to access a network (e.g., the Internet). The access point 105 may be replaced by any communication device (cell site). A computing device 110 may be a custom device or a mobile device that can retrieve content from the access point 105, and provide image data of artificial reality to a corresponding HWD 150. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (e.g., interlinks), respectively. In some embodiments, the computing device 110A communicates with the HWD 150A through a wireless link 125A (e.g., intralink), and the computing device 110B communicates with the HWD 150B through a wireless link 125B (e.g., intralink). In some embodiments, functionality of one or more components of the artificial reality system environment 100 can be distributed among the components in a different manner than is described here. For example, some of the functionality of the computing device 110 may be performed by the HWD 150. For example, some of the functionality of the HWD 150 may be performed by the computing device 110.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the wireless interface 165 includes an electronic component or a combination of an electronic component and a software component that communicates with the computing device 110. In some embodiments, the wireless interface 165 includes or is embodied as a transceiver for transmitting and receiving data through a wireless medium. The wireless interface 165 may communicate with a wireless interface 115 of a corresponding computing device 110 through a wireless link 125 (e.g., intralink). The wireless interface 165 may also communicate with the access point 105 through a wireless link (e.g., interlink). Examples of the wireless link 125 include a near field communication link, Wi-Fi direct, Bluetooth, or any wireless communication link. In some embodiments, the wireless link 125 may include one or more ultra-wideband communication links, as described in greater detail below. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations. In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may be a counterpart component to the wireless interface 165 to communicate with the HWD 150 through a wireless link 125 (e.g., intralink). The wireless interface 115 may also include a component to communicate with the access point 105 through a wireless link 102 (e.g., interlink). Examples of wireless link 102 include a cellular communication link, a near field communication link, Wi-Fi, Bluetooth, 60 GHz wireless link, ultra-wideband link, or any wireless communication link. The wireless interface 115 may also include a component to communicate with a different computing device 110 through a wireless link 185. Examples of the wireless link 185 include a near field communication link, Wi-Fi direct, Bluetooth, ultra-wideband link, or any wireless communication link. Through the wireless link 102 (e.g., interlink), the wireless interface 115 may obtain AR/VR content, or other content from the access point 105. Through the wireless link 125 (e.g., intralink), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118, 170 may configure or cause the wireless interfaces 115, 165 to toggle, transition, cycle or switch between a sleep mode and a wake up mode. In the wake up mode, the processor 118 may enable the wireless interface 115 and the processor 170 may enable the wireless interface 165, such that the wireless interfaces 115, 165 may exchange data. In the sleep mode, the processor 118 may disable (e.g., implement low power operation in) the wireless interface 115 and the processor 170 may disable the wireless interface 165, such that the wireless interfaces 115, 165 may not consume power or may reduce power consumption. The processors 118, 170 may schedule the wireless interfaces 115, 165 to switch between the sleep mode and the wake up mode periodically every frame time (e.g., 11 ms or 16 ms). For example, the wireless interfaces 115, 165 may operate in the wake up mode for 2 ms of the frame time, and the wireless interfaces 115, 165 may operate in the sleep mode for the remainder (e.g., 9 ms) of the frame time. By disabling the wireless interfaces 115, 165 in the sleep mode, power consumption of the computing device 110 and the HWD 150 can be reduced.

Systems and Methods for Ultra-Wideband Devices

In various embodiments, the devices in the environments described above may operate or otherwise use components which leverage communications in the ultra-wideband (UWB) spectrum. In various embodiments, UWB devices operate in the 3-10 GHz unlicensed spectrum using 500+ MHz channels which may require low power for transmission. For example, the transmit power spectral density (PSD) for some systems may be limited to −41.3 dBm/MHz. On the other hand, UWB may have transmit PSD values in the range of −5 to +5 dBm/MHz range, averaged over 1 ms, with a peak power limit of 0 dBm in a given 50 MHz band. Using simple modulation and spread spectrum, UWB devices may achieve reasonable resistance to Wi-Fi and Bluetooth interference (as well as resistance to interference with other UWB devices located in the environment) for very low data rates (e.g., 10 s to 100 s Kbps) and may have large processing gains. However, for higher data rates (e.g., several Mbps), the processing gains may not be sufficient to overcome co-channel interference from Wi-Fi or Bluetooth. According to the embodiments described herein, the systems and methods described herein may operate in frequency bands that do not overlap with Wi-Fi and Bluetooth, but may have good global availability based on regulatory requirements. Since regulatory requirements make the 7-8 GHz spectrum the most widely available globally (and Wi-Fi is not present in this spectrum), the 7-8 GHz spectrum may operate satisfactory both based on co-channel interference and processing gains.

Figure 3:
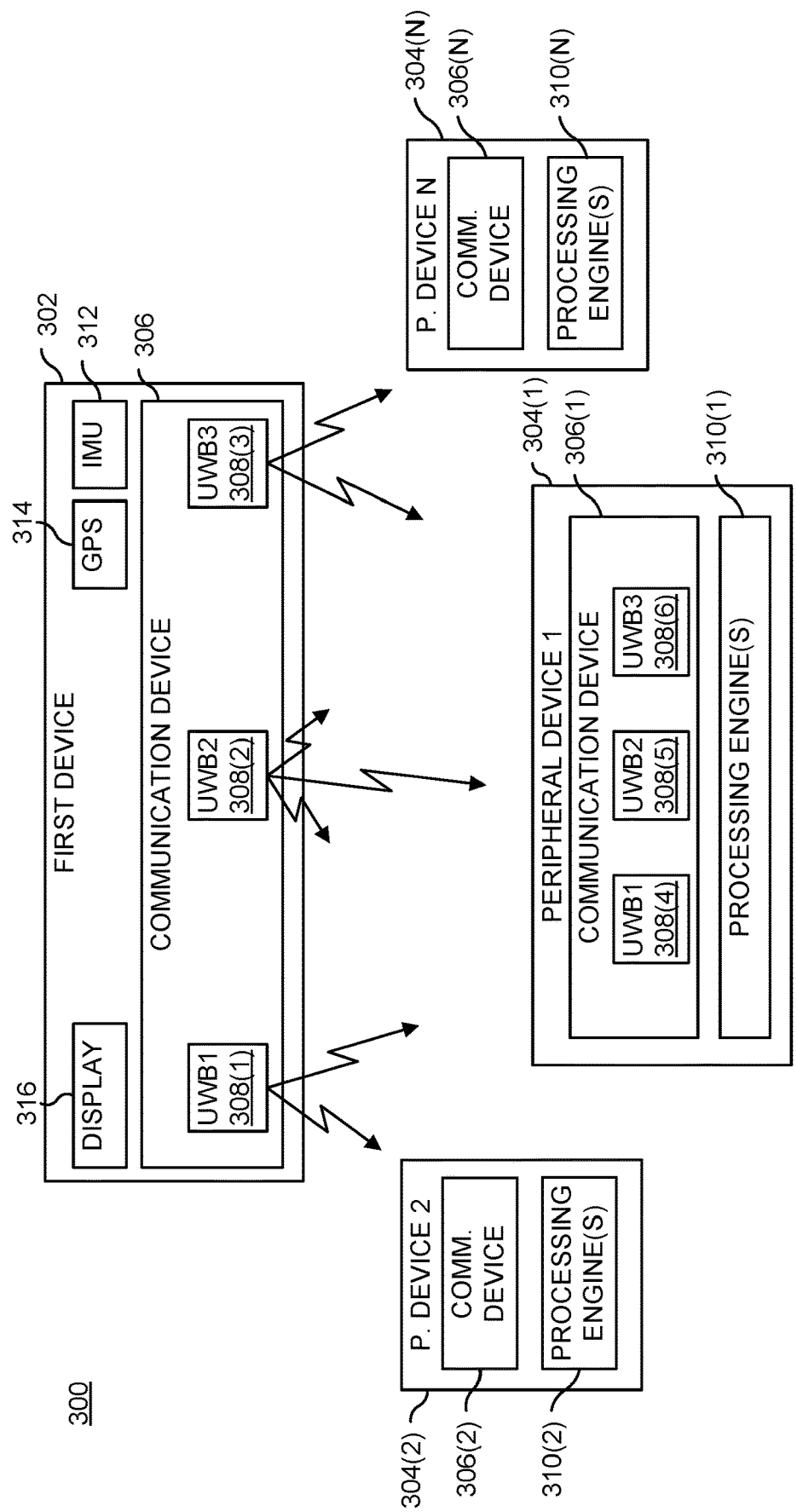
FIG. 3 is a block diagram of an artificial reality environment, according to an example implementation of the present disclosure.

Some implementations of UWB may focus on precision ranging, security, and for low-to-moderate rate data communication. As UWB employs relatively simple modulation, it may be implemented at low cost and low power consumption. In AR/VR applications (or in other applications and use cases), link budget calculations for an AR/VR controller link indicate that the systems and methods described herein may be configured for effective data throughput ranging from ~2 to 31 Mbps (e.g., with 31 Mbps being the maximum possible rate in the latest 802.15.4z standard), which may depend on body loss assumptions Referring now to FIG. 3, depicted is a block diagram of an artificial reality environment 300. The artificial reality environment 300 is shown to include a first device 302 and one or more peripheral devices 304(1)-304(N) (also referred to as "peripheral device 304" or "device 304"). The first device 302 and peripheral device(s) 304 may each include a communication device 306 including a plurality of UWB devices 308. A set of UWB devices 308 may be spatially positioned/located (e.g., spaced out) relative to each other on different locations on/in the first device 302 or the peripheral device 304, so as to maximize UWB coverage and/or to enhance/enable specific functionalities. The UWB devices 308 may be or include antennas, sensors, or other devices and components designed or implemented to transmit and receive data or signals in the UWB spectrum (e.g., between 3.1 GHz and 10.6 GHz) and/or using UWB communication protocol. In some embodiments, one or more of the devices 302, 304 may include various processing engines 310. The processing engines 310 may be or include any device, component, machine, or other combination of hardware and software designed or implemented to control the devices 302, 304 based on UWB signals transmitted and/or received by the respective UWB devices 308.

As noted above, the environment 300 may include a first device 302. The first device 302 may be or include a wearable device, such as the HWD 150 described above, a smart watch, AR glasses, or the like. In some embodiments, the first device 302 may include a mobile device (e.g., a smart phone, tablet, console device, or other computing device). The first device 302 may be communicably coupled with various other devices 304 located in the environment 300. For example, the first device 302 may be communicably coupled to one or more of the peripheral devices 304 located in the environment 300. The peripheral devices 304 may be or include the computing device 110 described above, a device similar to the first device 302 (e.g., a HWD 150, a smart watch, mobile device, etc.), an automobile or other vehicle, a beacon transmitting device located in the environment 300, a smart home device (e.g., a smart television, a digital assistant device, a smart speaker, etc.), a smart tag configured for positioning on various devices, etc. In some embodiments, the first device 302 may be associated with a first entity or user and the peripheral devices 304 may be associated with a second entity or user (e.g., a separate member of a household, or a person/entity unrelated to the first entity).

In some embodiments, the first device 302 may be communicably coupled with the peripheral device(s) 304 following a pairing or handshaking process. For example, the first device 302 may be configured to exchange handshake packet(s) with the peripheral device(s) 304, to pair (e.g., establish a specific or dedicated connection or link between) the first device 302 and the peripheral device 304. The handshake packet(s) may be exchanged via the UWB devices 308, or via another wireless link 125 (such as one or more of the wireless links 125 described above). Following pairing, the first device 302 and peripheral device(s) 304 may be configured to transmit, receive, or otherwise exchange UWB data or UWB signals using the respective UWB devices 308 on the first device 302 and/or peripheral device 304. In some embodiments, the first device 302 may be configured to establish a communications link with a peripheral device 304 (e.g., without any device pairing). For example, the first device 302 may be configured to detect, monitor, and/or identify peripheral devices 304 located in the environment using UWB signals received from the peripheral devices 304 within a certain distance of the first device 302, by identifying peripheral devices 304 which are connected to a shared Wi-Fi network (e.g., the same Wi-Fi network to which the first device 302 is connected), etc. In these and other embodiments, the first device 302 may be configured to transmit, send, receive, or otherwise exchange UWB data or signals with the peripheral device 304.

Figure 4:
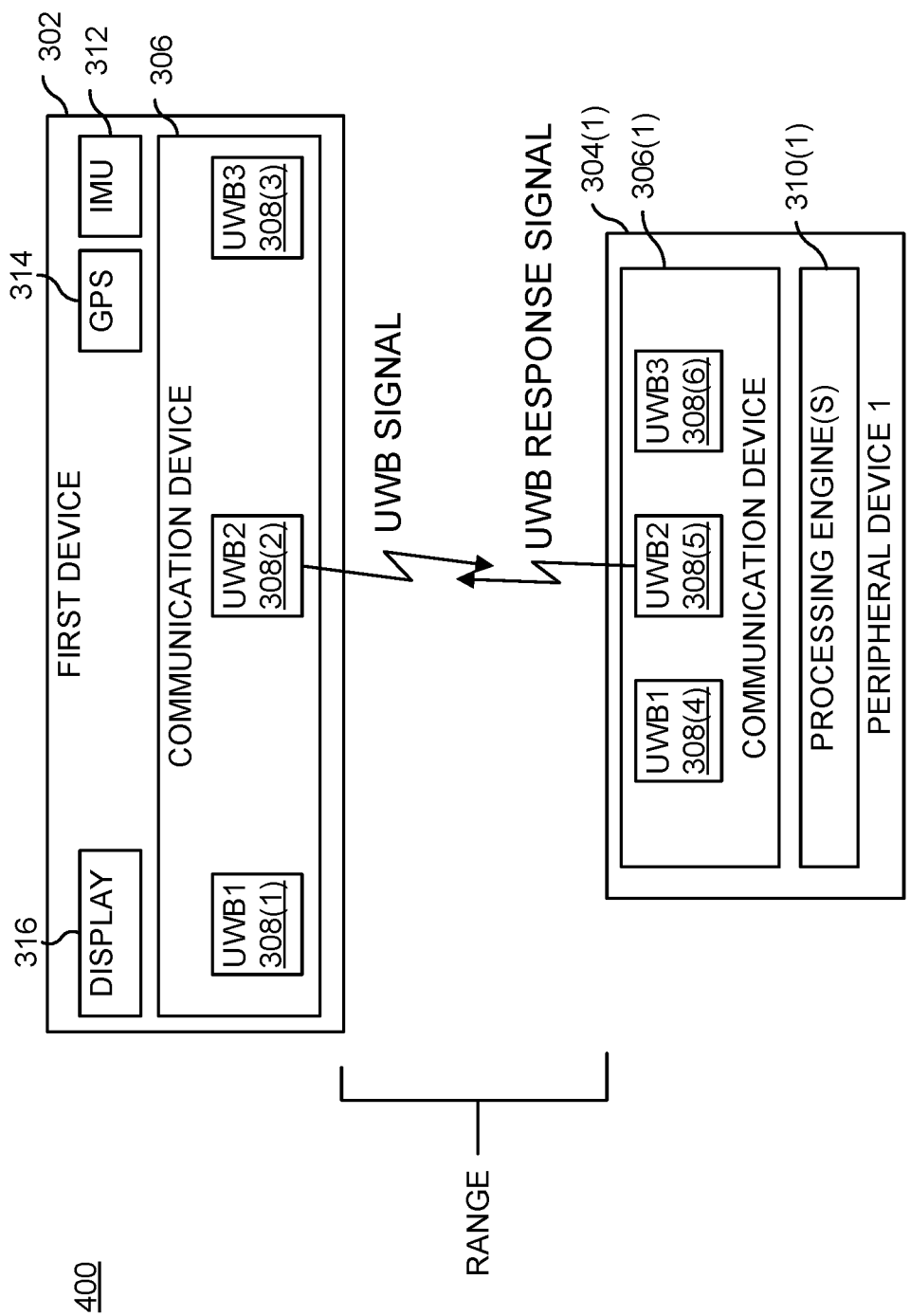
FIG. 4 is a block diagram of another artificial reality environment, according to an example implementation of the present disclosure.

Referring now to FIG. 4, depicted is a block diagram of an environment 400 including the first device 302 and a peripheral device 304. The first device 302 and/or the peripheral device 304 may be configured to determine a range (e.g., a spatial distance, separation) between the devices 302, 304. The first device 302 may be configured to send, broadcast, or otherwise transmit a UWB signal (e.g., a challenge signal). The first device 302 may transmit the UWB signal using one of the UWB devices 308 of the communication device 306 on the first device 302. The UWB device 308 may transmit the UWB signal in the UWB spectrum. The UWB signal may have a high bandwidth (e.g., 500 MHz). As such, the UWB device 308 may be configured to transmit the UWB signal in the UWB spectrum (e.g., between 3.1 GHz and 10.6 GHz) and having a high bandwidth (e.g., 500 MHz). The UWB signal from the first device 302 may be detectable by other devices within a certain range of the first device 302 (e.g., devices having a line of sight (LOS) within 200 m of the first device 302). As such, the UWB signal may be more accurate for detecting range between devices than other types of signals or ranging technology.

The peripheral device 304 may be configured to receive or otherwise detect the UWB signal from the first device 302. The peripheral device 304 may be configured to receive the UWB signal from the first device 302 via one of the UWB devices 308 on the peripheral device 304. The peripheral device 304 may be configured to broadcast, send, or otherwise transmit a UWB response signal responsive to detecting the UWB signal from the first device 302. The peripheral device 304 may be configured to transmit the UWB response signal using one of the UWB devices 308 of the communication device 306 on the peripheral device 304. The UWB response signal may be similar to the UWB signal sent from the first device 302.

The first device 302 may be configured to detect, compute, calculate, or otherwise determine a time of flight (TOF) based on the UWB signal and the UWB response signal. The TOF may be a time or duration between a time in which a signal (e.g., the UWB signal) is transmitted by the first device 302 and a time in which the signal is received by the peripheral device 304. The first device 302 and/or the peripheral device 304 may be configured to determine the TOF based on timestamps corresponding to the UWB signal. For example, the first device 302 and/or peripheral device 304 may be configured to exchange transmit and receive timestamps based on when the first device 302 transmits the UWB signal (a first TX timestamp), when the peripheral device receives the UWB signal (e.g., a first RX timestamp), when the peripheral device sends the UWB response signal (e.g., a second TX timestamp), and when the first device 302 receives the UWB response signal (e.g., a second RX timestamp). The first device 302 and/or the peripheral device 304 may be configured to determine the TOF based on a first time in which the first device 302 sent the UWB signal and a second time in which the first device 302 received the UWB response signal (e.g., from the peripheral device 304), as indicated by first and second TX and RX timestamps identified above. The first device 302 may be configured to determine or calculate the TOF between the first device 302 and the peripheral device 304 based on a difference between the first time and the second time (e.g., divided by two).

In some embodiments, the first device 302 may be configured to determine the range (or distance) between the first device 302 and the peripheral device 304 based on the TOF. For example, the first device 302 may be configured to compute the range or distance between the first device 302 and the peripheral device 304 by multiplying the TOF and the speed of light (e.g., TOF×c). In some embodiments, the peripheral device 304 (or another device in the environment 400) may be configured to compute the range or distance between the first device 302 and peripheral device 304. For example, the first device 302 may be configured to transmit, send, or otherwise provide the TOF to the peripheral device 304 (or other device), and the peripheral device 304 (or other device) may be configured to compute the range between the first device 302 and peripheral device 304 based on the TOF, as described above.

Figure 5:
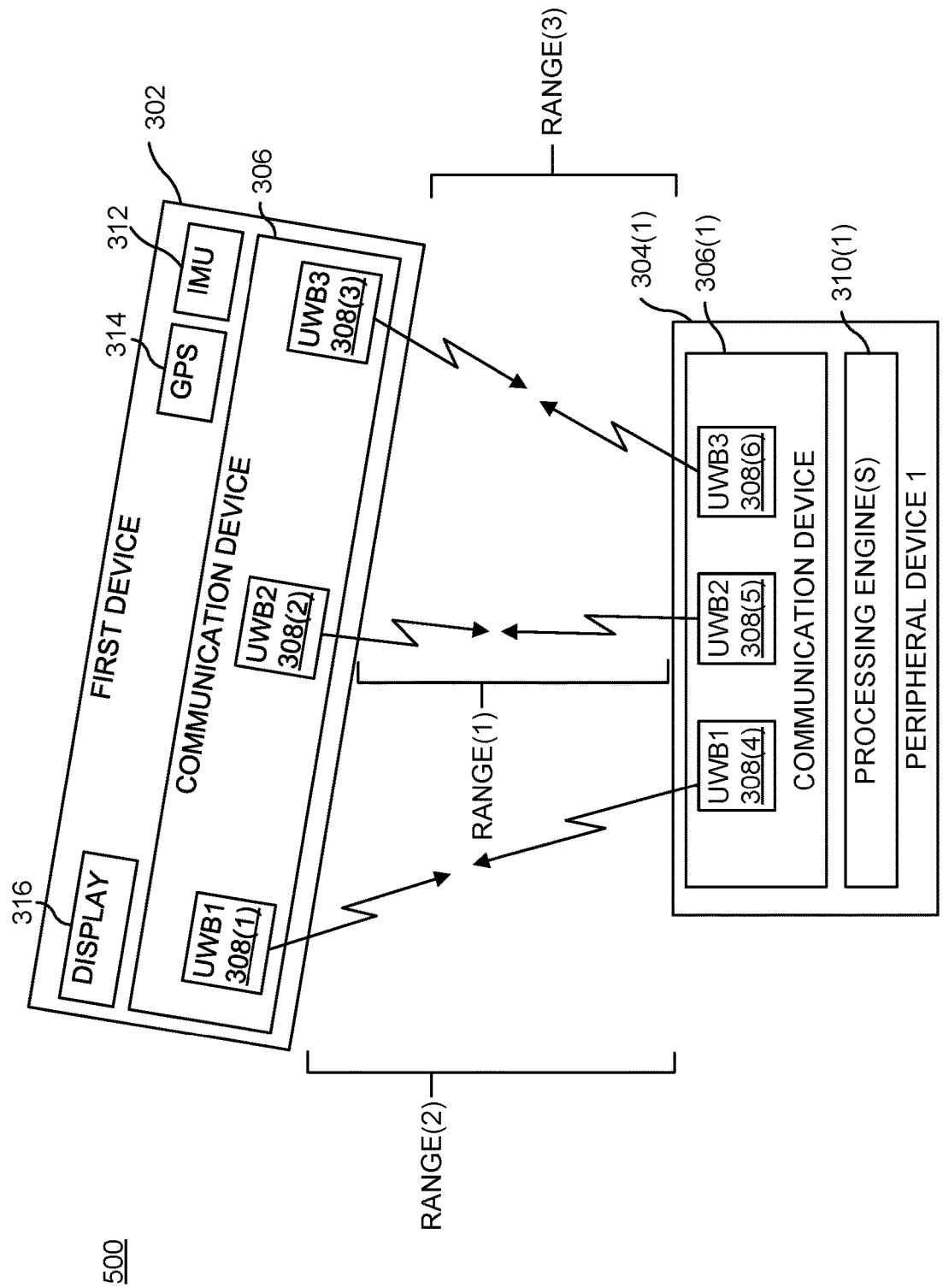
FIG. 5 is a block diagram of another artificial reality environment, according to an example implementation of the present disclosure.

Referring now to FIG. 5, depicted is a block diagram of an environment 500 including the first device 302 and a peripheral device 304. In some embodiments, the first device 302 and/or the peripheral device 304 may be configured to determine a position or pose (e.g., orientation) of the first device 302 relative to the peripheral device 304. The first device 302 and/or the peripheral device 304 may be configured to determine the relative position or orientation in a manner similar to determining the range as described above. For example, the first device 302 and/or the peripheral device 304 may be configured to determine a plurality of ranges (e.g., range(1), range(2), and range(3)) between the respective UWB devices 308 of the first device 302 and the peripheral device 304. In the environment 500 of FIG. 5, the first device 302 is positioned or oriented at an angle relative to the peripheral device 304. The first device 302 may be configured to compute the first range (range(1)) between central UWB devices 308(2), 308(5) of the first and peripheral device 304. The first range may be an absolute range or distance between the devices 302, 304, and may be computed as described above with respect to FIG. 4.

The first device 302 and/or the peripheral device 304 may be configured to compute the second range(2) and third range(3) similar to computing the range(1), In some embodiments, the first device 302 and/or the peripheral device 304 may be configured to determine additional ranges, such as a range between UWB device 308(1) of the first device 302 and UWB device 308(5) of the peripheral device 304, a range between UWB device 308(2) of the first device 302 and UWB device 308(6) of the peripheral device 304, and so forth. While described above as determining a range based on additional UWB signals, it is noted that, in some embodiments, the first device 302 and/or the peripheral device 304 may be configured to determine a phase difference between a UWB signal received at a first UWB device 308 and a second UWB device 308 (i.e., the same UWB signal received at separate UWB devices 308 on the same device 302, 304). The first device 302 and/or the peripheral device 304 may be configured to use each or a subset of the computed ranges (or phase differences) to determine the pose, position, orientation, etc. of the first device 302 relative to the peripheral device 304. For example, the first device and/or the peripheral device 304 may be configured to use one of the ranges relative to the first range(1) (or phase differences) to determine a yaw of the first device 302 relative to the peripheral device 304, another one of the ranges relative to the first range(1) (or phase differences) to determine a pitch of the first device 302 relative to the peripheral device 304, another one of the ranges relative to the first range(1) (or phase differences) to determine a roll of the first device 302 relative to the peripheral device 304, and so forth.

By using the UWB devices 308 at the first device 302 and peripheral devices 304, the range and pose may be determined with greater accuracy than other ranging/wireless link technologies. For example, the range may be determined within a granularity or range of +/−0.1 meters, and the pose/orientation may be determined within a granularity or range of +/−5 degrees.

Referring to FIG. 3-FIG. 5, in some embodiments, the first device 302 may include various sensors and/or sensing systems. For example, the first device 302 may include an inertial measurement unit (IMU) sensor 312, global positioning system (GPS) 314, etc. The sensors and/or sensing systems, such as the IMU sensor 312 and/or GPS 314 may be configured to generate data corresponding to the first device 302. For example, the IMU sensor 312 may be configured to generate data corresponding to an absolute position and/or pose of the first device 302. Similarly, the GPS 314 may be configured to generate data corresponding to an absolute location/position of the first device 302. The data from the IMU sensor 312 and/or GPS 314 may be used in conjunction with the ranging/position data determined via the UWB devices 308 as described above. In some embodiments, the first device 302 may include a display 316. The display 316 may be integrated or otherwise incorporated in the first device 302. In some embodiments, the display 316 may be separate or remote from the first device 302. The display 316 may be configured to display, render, or otherwise provide visual information to a user or wearer of the first device 302, which may be rendered at least in part on the ranging/position data of the first device 302.

One or more of the devices 302, 304 may include various processing engine(s) 310. As noted above, the processing engine(s) 310 may be or include any device, component, machine, or combination of hardware and software designed or implemented to control the devices 302, 304 based on UWB signals transmitted and/or received by the respective UWB devices 308. In some embodiments, the processing engine(s) 310 may be configured to compute or otherwise determine the ranges/positions of the first device 302 relative to the peripheral devices 304 as described above. In some embodiments, the processing engines 310 may be located or embodied on another device in the environment 300-500 (such as at the access point 105 as described above with respect to FIG. 1). As such, the first device 302 and/or peripheral devices 304 may be configured to off-load computation to another device in the environment 300-500 (such as the access point 105). In some embodiments, the processing engines 310 may be configured to perform various functions and computations relating to radio transmissions and scheduling (e.g., via the UWB devices 308 and/or other communication interface components), compute or otherwise determine range and relative position of the devices 302, 304, manage data exchanged between the devices 302, 304, interface with external components (such as hardware components in the environment 300-500, external software or applications, etc.), and the like. Various examples of functions and computations which may be performed by the processing engine(s) 310 are described in greater detail below.

Systems and Methods of Narrowband Discovery for Wireless Devices

In various implementations, UWB protocol may not have any defined discovery mechanism for controllers or controlees to support services between UWB devices. While narrowband physical layer (PHY) modes may be proposed, the narrowband signaling may be dedicated to control and status updates. The systems and methods described herein provide a novel discovery mechanism in narrowband channels for ultra-wideband (UWB) devices.

Figure 6:
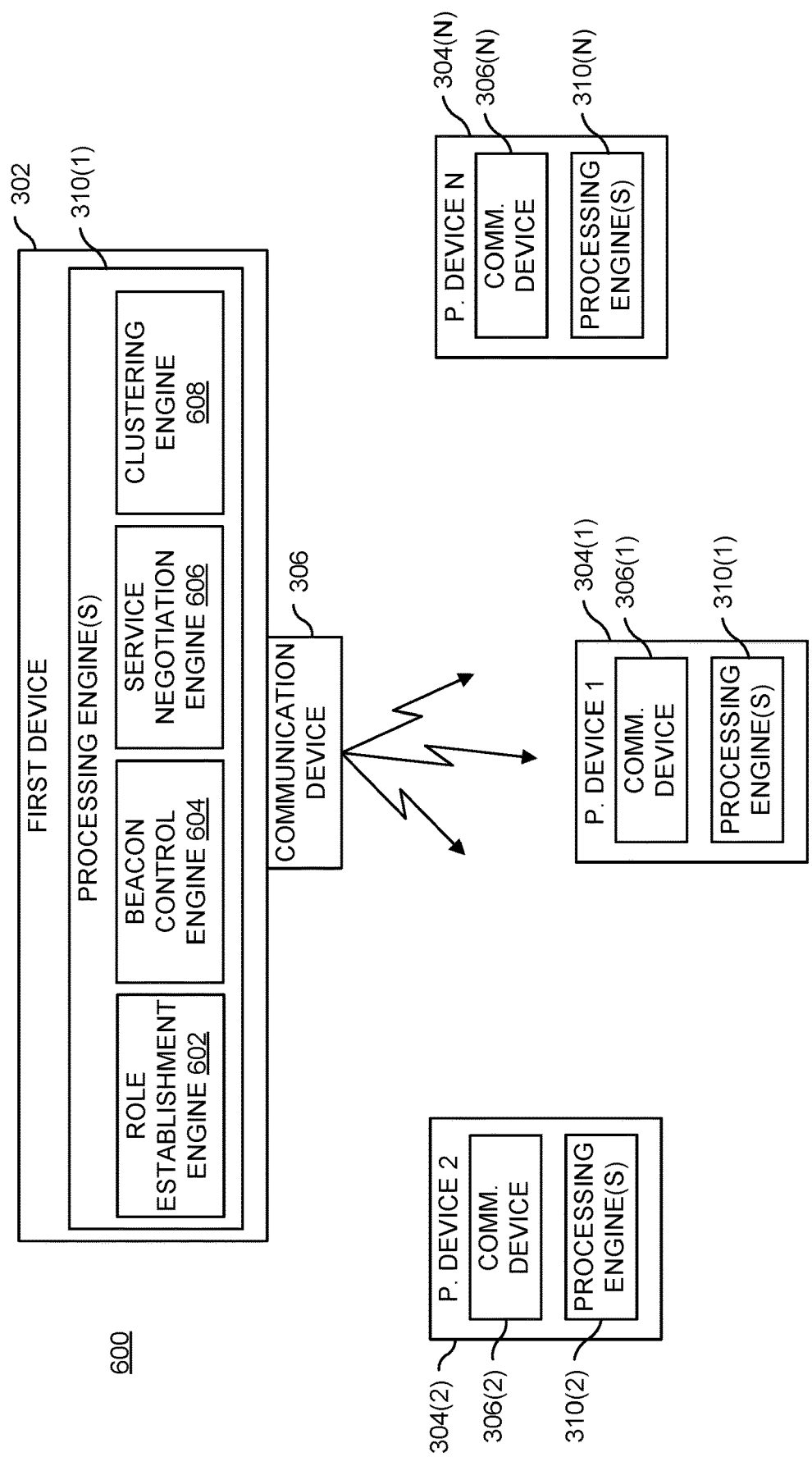
FIG. 6 is a block diagram of a system for narrowband discovery for wireless devices, according to an example implementation of the present disclosure.

Referring now to FIG. 6, depicted is a system 600 for narrowband discovery for wireless devices, according to an example implementation of the present disclosure. As shown in FIG. 6, the system 600 may include a first device 302 (also referred to herein as "controller 302" or "first UWB device") and one or more peripheral device(s) 304 (also referred to herein as "controlee 304" or "second device 304" or "second UWB device"). The first device 302 and peripheral device(s) 304 may be similar to the devices 302, 304 described above with reference to FIG. 3-FIG. 5. As described in greater detail below, the first device 302 may be configured to transition/hop between a plurality of defined narrowband channels to broadcast discovery beacons for receipt by the peripheral devices 304. The first device 302 may be configured to receive (e.g., in the same narrowband channel) a request (e.g., service discovery request) for one or more services to be performed between the devices 302, 304, from a respective peripheral device 304 on one of the narrowband channels. The first device 302 may be configured to send (e.g., in the same narrowband channel) a response frame (e.g., service discovery response) to the peripheral device 304 in response to the request.

According to the systems and methods described herein, the devices 302, 304 may provide or perform narrowband discovery for wireless devices and/or for service(s) supported by the wireless devices, in a computing environment. For example, and in some implementations, the first device 302 (e.g., a controller) may be configured to transmit a discovery beacon on a preferred discovery channel (PDC) of a plurality of preferred discovery channels within a frequency spectrum. The first device 302 may be configured to receive, from a second device 304 (e.g., a controlee), a service discovery request frame responsive to the second device receiving the discovery beacon on the preferred discovery channel. The first device 302 may be configured to transmit a service discovery response frame to the second device 304 on the preferred discovery channel responsive to receiving the service discovery request frame.

The devices 302, 304 are shown to include various processing engines 310. The processing engine(s) 310 may include a role establishment engine 602, a beacon control engine 604, a service negotiation engine 606, and/or a clustering engine 608. The processing engine(s) 602 may be or include any device, component, element, circuitry, processor(s) or hardware (e.g., to execute software) configured to perform various operations of the device 302, 304 as described herein. It is noted that the peripheral devices 304 may include the same or similar processing engines 310 as those shown to be included on the first device 302. For instance, the peripheral devices 304 may include a role establishment engine 602, a beacon control engine 604, and/or a service negotiation engine 606.

In some embodiments, the first device 302 and peripheral devices 304 may be located in an environment, such as the environment shown in FIG. 3-FIG. 5. The role establishment engine 602 may be configured to determine, set, generate, or otherwise establish (e.g., determine, set, define) roles for the devices 302, 304 within the environment. In some embodiments, the role establishment engine 602 executing on the respective devices 302, 304 may be configured to establish roles for the respective devices 302, 304. The role establishment engines 602 may be configured to establish the devices 302, 304 as a controller (or master, lead, primary, and so forth) role or a controlee (or slave, subordinate, secondary, and so forth) role. As described herein, the first device 302 may be a controller (or be in a controller role), and the peripheral device(s) 304 may be controlee(s) (or be in controlee roles). The role establishment engine 602 of the first device 302 may be configured to establish the role of the first device 302 as a controller within the environment based on various inputs. For example, the role establishment engine 602 may be configured to establish the first device 302 as the controller based on a device type for the first device 302 being a controller device, based on a default setting for the first device 302, based on a user setting, etc. Similarly, the role establishment engine 602 of the peripheral device(s) 304 may be configured to establish the role of the peripheral devices 304 as a controlee based on a device type being a controlee device, based on a default setting for the peripheral device(s) 304, based on a user setting, etc. The first device 302 and peripheral device(s) 304 may be configured to negotiate, determine, set, define, or otherwise establish their role as a controller/controlee prior to performing any ranging, data communications, etc., within the environment.

Figure 7:
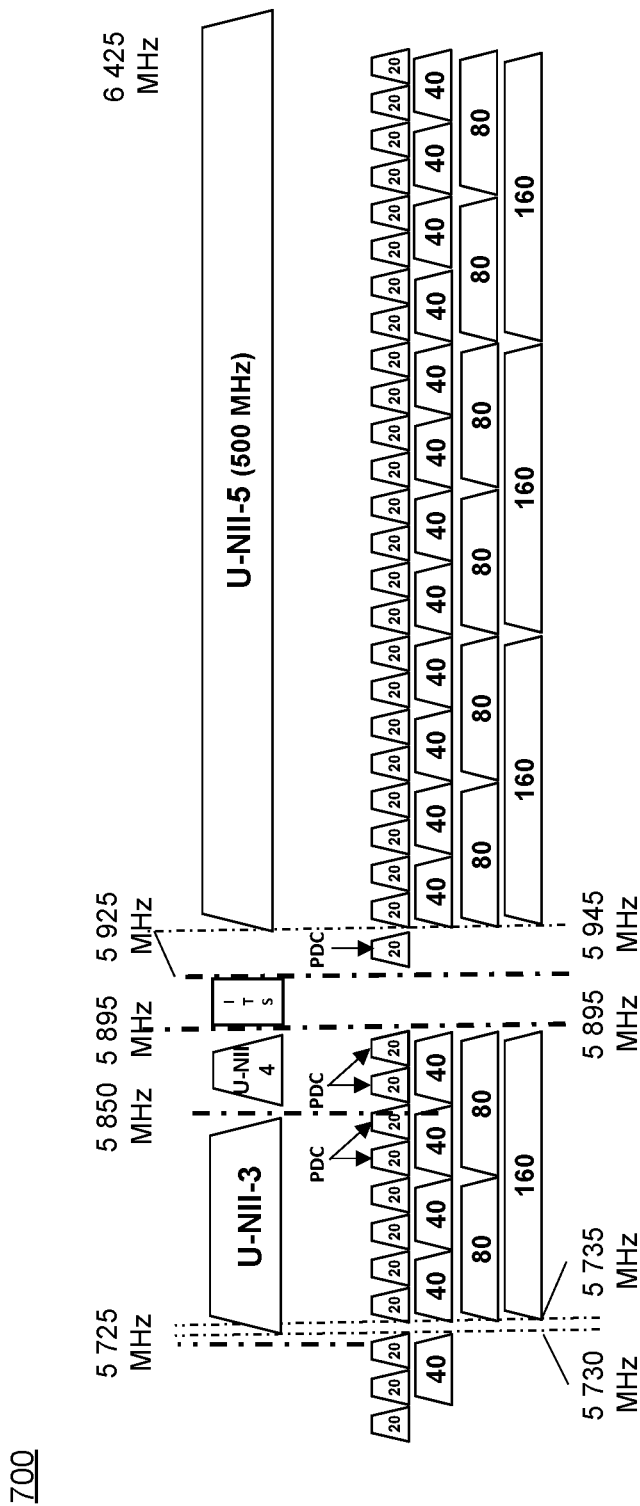
FIG. 7 is a diagram showing frequency ranges and channels, according to an example implementation of the present disclosure.

Referring to FIG. 7, depicted is a channel diagram 700 showing frequency ranges which may be used in the systems and methods described herein. In some embodiments, the channel diagram 700 defines, identifies or specifies narrowband preferred discovery channels (PDCs). The preferred discovery channels may be dedicated or preferred channels in which controllers 302/controlees 304 can discover other/neighboring devices within an environment 300, 400, 500. Each preferred discovery channel may be a narrowband channel with a unique identifier. Each preferred discovery channel may be dedicated for discovery of or by controlee(s)/controller(s). In some instances, the preferred discovery channels may have a fixed channel bandwidth separation. The preferred discovery channels may have any bandwidth or range of frequencies (such as 2.5 MHz, 10 MHz, 20 MHz, 40 MHz, 80 MHz, etc.), and may be defined within various frequency bands. For example, the preferred discovery channels may be defined within the 2.4 GHz band, within the U-NII-3 band, within the U-NII-4 band, within the U-NII-5 band, U-NII-6 band, U-NII-7 band, U-NII-8 band, etc. The following table and the channel diagram shown in FIG. 7, can include various examples of preferred discovery channels having different narrowband channel bandwidths and on different frequency bands. It is noted that the present disclosure is not limited to the particular channel bandwidths or preferred discovery channels.

TABLE 1

Preferred Discovery Channels (PDCs) with multiple narrowband channel bandwidths in multiple frequency bands.

| Narrowband Channel Bandwidth | Preferred Discovery Channel | Frequency Band |
| --- | --- | --- |
| 20 MHz | Channel 6 | 2.4 GHz |
| 20 MHz | Between 5810-5830 MHz Between 5830-5850 MHz Multiple of 20 MHz Between 5725-5810 MHz | U-NII-3 |

TABLE 1-continued

Preferred Discovery Channels (PDCs) with multiple narrowband channel bandwidths in multiple frequency bands.

| Narrowband Channel Bandwidth | Preferred Discovery Channel | Frequency Band |
| --- | --- | --- |
| 40 MHz | Between 5810-5850 MHz Any one or two of 40 MHz bands between 5725-5810 MHz | U-NII-3 |
| 2.5 MHz | Multiple of 2.5 MHz between 5725-5850 MHz | U-NII-3 |
| 20 MHz | Multiple of 20 MHz between 5850-5895 MHz | U-NII-4 |
| 20 MHz | Between 5905-5925 MHz; and/or Multiple of 20 MHz between 5925-6425 MHz | U-NII-5 |
| 2.5 MHz | Multiple of 2.5 MHz between 5905-6425 MHz | U-NII-5 |
| 20 MHz | Multiple of 20 MHz Between 6425-6525 MHz | U-NII-6 |
| 20 MHz | Multiple of 20 MHz Between 6525-6875 MHz | U-NII-7 |
| 20 MHz | Multiple of 20 MHz Between 6875-7125 MHz | U-NII-8 |

Figure 8:
FIG. 8 is a diagram showing a channel hopping pattern used by a controller device, according to an example implementation of the present disclosure.

Referring now to FIG. 6 and FIG. 8, the beacon control engine 604 of the first device 302 may be configured to transmit, send, broadcast or otherwise provide (and the beacon control engine 604 of the peripheral device 304 may be configured to receive) a discovery beacon in one or more PDCs or narrowband channels. Specifically, FIG. 8 shows a channel hopping pattern (or sequence) 800 used by a controller, according to an example implementation of the present disclosure. In some embodiments, the controllers 302 (such as the first device 302) may be configured to communicate, broadcast, transmit, send, or otherwise provide (e.g., via the communication device 306) a discovery beacon within a specific preferred discovery channel. In some embodiments, the controllers 302 may be configured to provide the discovery beacon within the preferred discovery channel at various periods or intervals (such as every 20 ms, 30 ms, 40 ms, 50 ms, 60 ms, 70 ms, etc.). In some embodiments, the controllers 302 may be configured to provide the discovery beacon on the preferred discovery channel a predetermined number of times and/or for a predetermined duration. For example, the controllers 302 may be configured to provide the discovery beacon on the preferred discovery channel three times (e.g., once at a first time instance, once after a first predetermined period or interval, and once after a second predetermined period or interval). As another example, the controllers 302 may be configured to provide the discovery beacon on the preferred discovery channel for a predetermined duration (e.g., broadcast the discovery beacon any number of times for 100 ms).

In at least some of these embodiments, the controllers 302 may switch, alternate, move, (frequency) hop, or otherwise transition between preferred discovery channels. As shown in FIG. 8, the controllers 302 may be configured to transition between preferred discovery channels according to a fixed pattern (e.g., remaining on a first preferred discovery channel for a predetermined duration with a fixed number of discovery beacons (e.g., one beacon), hopping to a second discovery channel and remaining on the second discovery channel for the predetermined duration to send the fixed number of discovery beacons, hopping to a third discovery channel, and so forth). In the example shown on FIG. 8, the controller 302 may be configured to transmit, send, provide, or otherwise broadcast a plurality of discovery beacons (shown as three, though any number of discovery beacons may be broadcast) on the first preferred discovery channel for a duration, can transition to a second preferred discovery channel and can broadcast a plurality discovery beacons on the second preferred discovery channel for the duration, transition to a third preferred discovery channel, and so forth, until reaching the final preferred discovery channel. At the final preferred discovery channel, the controller 302 may be configured to broadcast one or more discovery beacons for the duration, and then can return back to the first preferred discovery channel.

Each preferred discovery channel may be or include a narrowband channel. As described above with reference to Table 1 and FIG. 7, the narrowband channels may be or include 20 MHz narrowband channels, 40 MHz narrowband channels, or other narrowband channels. The controller 302 may be configured to reside on a respective preferred discovery channel for a duration. The duration may be, for instance, 50 ms, though other durations may be used.

The controllers 302 may be configured to transmit, send, or otherwise provide a transition sequence or pattern for the discovery channels (e.g., the hopping pattern between preferred discovery channels) within the discovery beacon to controlees or potential controlees in the environment. For example, each discovery beacon transmitted by a controller 302 may include, for example, one or more durations or time windows in which the controller 302 is to reside on a given channel, a listing of channels (e.g., channel identifiers, etc.) and/or a sequence of channels over which the controller is to transition/hop. In some embodiments, and as described in greater detail below with reference to FIG. 9, discovery and service negotiation between the devices 302, 304 may be conducted over a hopping sequence (e.g., over a round of transitions from a first preferred discovery channel to other channels and back to the preferred discovery channel, in a specific/defined order). Such implementations may avoid jamming within the discovery channels, such that the systems and methods described herein can be robust against instantaneous interference within a discovery channel.

In some embodiments, the beacon control engine 604 of the first device 302 may be configured to incorporate, specify, transmit, send, or otherwise provide a time synchronization function (TSF) within the discovery beacon. For example, the controller 302 may be configured to provide a TSF by including a remaining time to the next beacon transmission in the discovery beacon. The time may be measured from the end of the current beacon transmission, or from the beginning of the next beacon transmission. In some embodiments, the controller 302 may be configured to include the time remaining for the controller 302 to switch from the current preferred discovery channel to the next preferred discovery channel (and an identifier for the next preferred discovery channel).

Figure 9:
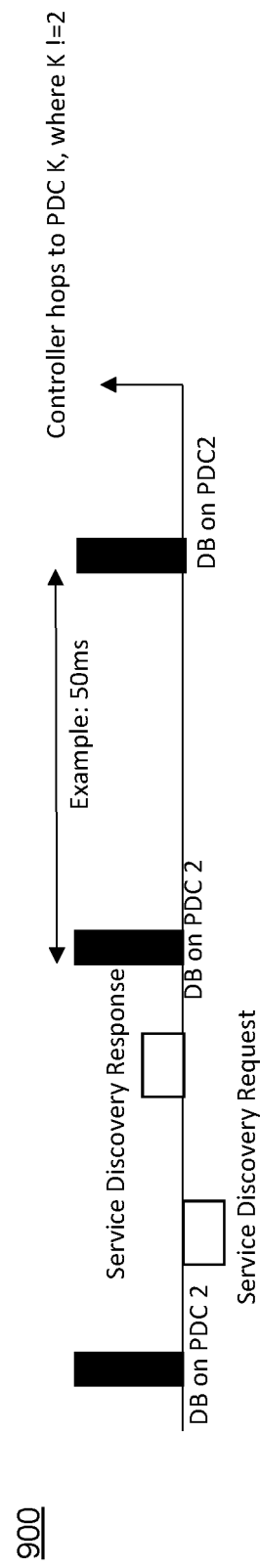
FIG. 9 is a diagram illustrating discovery or negotiation of services over a narrowband discovery channel, according to an example implementation of the present disclosure.

Referring now to FIG. 6 and FIG. 9, where a controlee 304 is located in an environment/vicinity of a controller 302, the controlee 304 may be configured to detect and/or receive the discovery beacon from the controller 302 on the preferred discovery channel. Specifically, FIG. 9 is a diagram 900 showing example negotiation/discovery of services over a narrowband preferred discovery channel, according to an example implementation of the present disclosure. The controlee 304 may be configured to receive the discovery beacon responsive to (or after) switching to the preferred discovery channel, responsive to enabling wireless communications to monitor the preferred discovery channel, etc. In some embodiments, if the preferred discovery channels are known to (e.g., pre-configured for) the devices 302, 304, the controlee 304 may be configured to automatically select one of the preferred discovery channels to reside on, e.g., responsive to enabling wireless communications (or otherwise initializing). The controlee 304 may be configured to receive the beacon responsive to the first device 304 transitioning to the same preferred discovery channel and broadcasting the discovery beacon.

The controlee(s) 304 may be configured to monitor for, detect, identify, or otherwise receive the discovery beacon from the controller 302. The controlee(s) 304 may be configured to receive the discovery beacon responsive to the controller 302 and controlee(s) 304 being on the same preferred discovery channel at substantially the same time. In some embodiments, the beacon control engine 604 of the controlee 304 may be configured to process (e.g., parse, inspect, decode) the discovery beacon to identify various attributes of the discovery beacon. For example, the beacon control engine 604 may be configured to identify the TSF sent by the controller 302 and/or the hopping/transmission schedule sent by the controller 302, both of which may be included in the discovery beacon.

The service negotiation engine 606 of the controlee(s) 304 may be configured to produce, create, establish, or otherwise generate a service discovery request frame for the controller 302. The service negotiation engine 606 may be configured to generate the service discovery request frame responsive to receiving or detecting the discovery beacon from the controller 302. The service discovery request frame may be a frame which can be used to request one or more services to be performed between the controller 302 and the controlee 302. For example, the service discovery request frame may be a frame to signal that the controlee 304 is requesting data communication, ranging, and/or other services from the controller 302. The service discovery request frame may be sent to request a schedule for each of the requested service. For example, the service discovery request frame be used to request a minimum/maximum data service round interval, a minimum/maximum data service round duration, a minimum/maximum ranging service round interval, and/or minimum/maximum ranging service round duration. The service negotiation engine 606 may transmit, send, or otherwise provide the service discovery request frame to the controller 302.

The service negotiation engine 606 may be configured to provide (e.g. via a transmitter) the service discovery request frame to the controller 302 on the preferred discovery channel in which the controlee 304 received the discovery beacon. In some embodiments, the service negotiation engine 606 may be configured to provide the service discovery request frame to the controller 302 during the same interval or hopping sequence, such that the discovery beacon and the service discovery request are exchanged within a duration in which the controller 302 resides on the preferred discovery channel (e.g., the controller 302 has not hopped to a different preferred discovery channel). In some embodiments, the service negotiation engine 606 may be configured to provide the service discovery request frame to the controller over a hopping sequence (e.g., after the controller 302 has hopped to one or more other preferred discovery channels and returned back to the same preferred discovery channel on which the controlee 304 received the discovery beacon).

In some embodiments, the controlee 304 may be configured to synchronize one or more clocks of the controlee 304 according to the TSF received from the controller 302. For example, the controlee 304 may be configured to set a clock of the controlee 304 according to the transmission/hopping schedule provided by the controller 302 in the discovery beacon. The controlee 304 may be configured to perform clock synchronization in accordance with the TSF provided by the controller 302 in the discovery beacon. Once/after the controlees 304 perform clock synchronization, the controlees 304 may be configured to enter a doze/sleep/low-power state until the time when the next packet or beacon is received from the controller 302, and/or until the start of a service (and/or until the controller 302 is otherwise present on the same preferred discovery channel as the controller 304 as set forth in the transmission or hopping schedule). Such implementations may provide for overall reductions in power consumption of devices in the system by providing for increased sleep times (e.g., low power operation windows) after device discovery and/or service discovery.

Once the controller 302 receives the service discovery request frame from a controlee 304 in the environment, the service negotiation engine 606 of the controller 302 may be configured to derive, determine, or otherwise generate a service discovery response frame for sending (e.g., via a transmitter or wireless interface) to the controlee 304. The service discovery response frame may be similar in some regards to the service discovery request frame. For example, the service discovery response frame may signal, indicate, or otherwise provide a response to the requested service(s) and the requested schedule. For example, the service discovery response frame may provide an indication of an acceptance, a suggestion, and/or a rejection of requested services (e.g., ranging, data communication, etc.), and/or service schedule (s). For example, the service discovery response frame may include, among other data, a data service round interval, data service round duration, ranging service round interval, and/or ranging service round duration. The service negotiation engine 606 may be configured to send, transmit, or otherwise provide the service discovery response frame to the controlee 304. The service negotiation engine 606 may provide the service discovery response frame to the controlee 304 on the preferred discovery channel in which the discovery beacon was sent and the service discovery request frame was received. The service negotiation engine 606 may be configured to provide the service discovery response frame to the controlee 304 during the same interval or hopping sequence (e.g., such that the discovery beacon, service discovery request frame, and service discovery response frame are exchanged while the controller 302 is on the preferred discovery channel without transitioning to a different channel).

In some embodiments, the service negotiation engine 606 may be configured to provide the service discovery response frame to the controlee 304 over one or more hops according to a hopping sequence. For example, the controller 302 may be configured to provide the discovery beacon on a first preferred discovery channel at a first interval, transition/hop to other preferred discovery channels and back to the first preferred discovery channel, receive the service discovery request frame on the first preferred discovery channel from the controlee 304 at a second interval, transition to other preferred discovery channels and back to the first preferred discovery channel, and transmit the service discovery response frame to the controlee 304 at a third interval. As another example, the controller 302 may be configured to provide the discovery beacon on a first preferred discovery channel at a first interval, transition to other preferred discovery channels and back to the first preferred discovery channel, receive the service discovery request frame on the first preferred discovery channel from the controlee 304 at a second interval and transmit the service discovery response frame to the controlee 304 during the second interval.

In some embodiments, the controller 302 and/or the controlee 304 (e.g., service negotiation engine 606 of the controller 302 and/or controlee 304) may generate and provide an acknowledgement (ACK) frame of received packets/frames. For example, the controlee 304 may generate and send an ACK frame to the controller 302 acknowledging receipt of the discovery beacon and/or the service discovery response frame. Similarly, the controller 302 may generate and send an ACK frame to the controlee(s) 304 acknowledging receipt of the service discovery request frame.

In some embodiments, the controller 302 may be configured to identify a number of controlees 304 in the environment to which to form a cluster. For example, the clustering engine 608 may be configured to identify, determine, group, or otherwise select a plurality of controlees 304 to form a cluster. The clustering engine 608 may be configured to identify the controlees 304 to include in the cluster based on controlees 304 having similar attributes, requesting similar services, etc. For example, the clustering engine 608 may identify a plurality of controlees 304 requesting the same services and having similar capabilities (or being/having similar device types). The controller 302 may select the plurality of controlees 304 to generate the cluster. The controller 302 may generate, determine, define, or otherwise set a cluster identifier (or one of the controlees 304 may generate the cluster identifier). The cluster identifier may be included in each of the communications by the controller 302 and/or controlees 304. In some embodiments, the controller 302 and/or controlees 304 may include the cluster identifier in each of the communications between the controller 302/controlees 304 indefinitely, until expiration of a period, until explicit termination (e.g., of a service type, or of the controller's role), etc.

Figure 10:
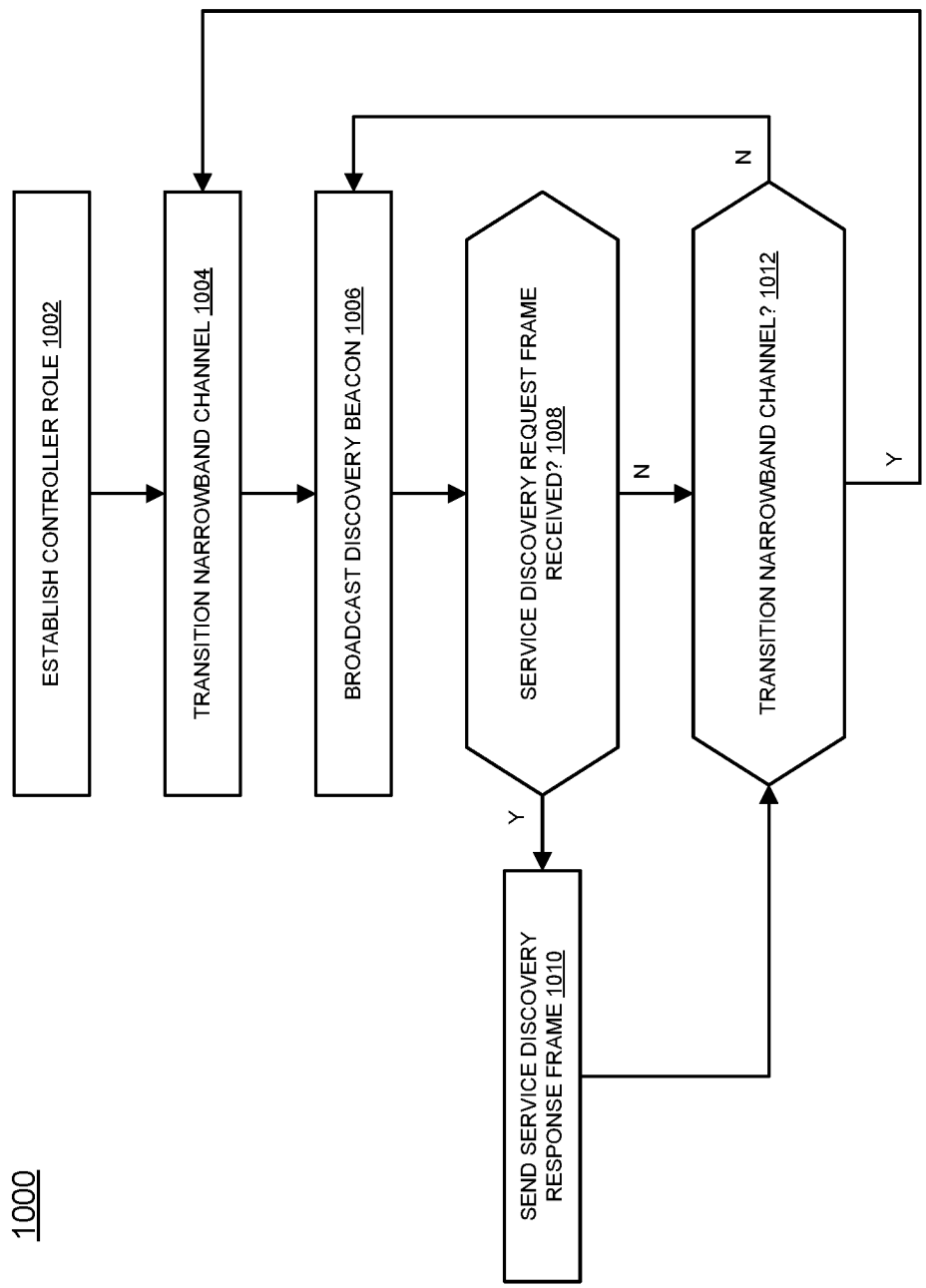
FIG. 10 is a flowchart showing a method 1000 of narrowband discovery for controller devices, according to an example implementation of the present disclosure.

Referring now to FIG. 10, depicted is a flowchart showing a method 1000 of narrowband discovery for controller devices, according to an example implementation of the present disclosure. The method 1000 shown in FIG. 10 may be performed by the devices, components, elements, or hardware described above with reference to FIG. 1-FIG. 9. As a brief overview, at step 1002, a device may establish its role as a controller. At step 1004, the device may transition to a narrowband channel. At step 1006, the device may broadcast a discovery beacon. At step 1008, the device may determine whether a service discovery request frame has been received. At step 1010, the device may transmit a service discovery response frame. At step 1012, the device may determine whether to transition to a different narrowband channel. In some embodiments, there may be more or fewer steps, and/or the order of the steps may be different.

At step 1002, a device may establish its role as a controller, or determine to be or to operate as a controller. In some embodiments, the device may establish a controller role for the device from two available roles (e.g., a controller role and/or a controlee role). The device may establish a controller role for the device based on various characteristics or settings for the device. For instance, the device may establish the controller role for the device responsive to a default/pre-configured setting for the device (e.g., selected or otherwise defined by a user of the device, by a manufacturer of the device, and so forth). As another example, the device may establish the controller role for the device based on a device type of the device (e.g., the device being a mobile phone or smart phone, a personal computer, a computing device, etc.). As another example, the device may establish the controller role for the device based on one or more services that the device can provide or support. As still another example, the device may establish the controller role for the device based on characteristics, such as processing power/speed, memory storage, etc. with respect to other devices.

In some embodiments, the device may establish a cluster of devices according to attributes of other devices in the environment. For example, the device may establish a device cluster according to services requested from and/or provided to the devices in the cluster, according to capabilities of the devices in the cluster, etc. In some embodiments, the device may establish the cluster of devices at initialization of the device. In some embodiments, the device may establish the cluster of devices upon detecting a presence of the other devices. In some embodiments, the device may establish the cluster of devices upon receipt of the service discovery request frame(s) from the device(s) (e.g., at step 1008 as described in greater detail below).

At step 1004, the device may transition to a narrowband channel (or a preferred discovery channel). In some embodiments, the device (e.g., the controller) may transition to a first narrowband channel of a plurality of defined narrowband channels. The device may transition to the first narrowband channel to broadcast a discovery beacon for receipt by one or more UWB devices (e.g., controlee devices). The device may transition to the first narrowband channel according to a channel hopping schedule. The device may transition to the narrowband channel for a duration, then hop/switch/move to/transition to another narrowband channel of the plurality of narrowband channels, according to the channel hopping schedule/pattern.

At step 1006, the device may broadcast a discovery beacon. In some embodiments, the device may broadcast the discovery beacon on a given narrowband channel responsive to transitioning/hopping to (e.g., tuning/configuring a transmit chain and/or antenna of the device to operate in) the narrowband channel. The device may broadcast the discovery beacon using the UWB antenna(s) of the device. The device may broadcast the discovery beacon to any neighboring devices (e.g., controlees). The device may broadcast the discovery beacon on the narrowband channel selected and transitioned to, at step 1004.

In some embodiments, the device may generate the discovery beacon for broadcasting. In some embodiments, the device may generate the discovery beacon to identify/inform a sequence, series, or order of narrowband channels in which the device is transitioning between (e.g., a hopping pattern). For example, the device may generate the discovery beacon to identify the order of narrowband channels that the device transitions to, and a duration in which the device is to remain on a given narrowband channel (e.g., the hopping pattern). In other words, the hopping pattern included in the discovery beacon may itself include the order or transition sequence of the device with respect to the narrowband channels, and/or a duration in which the device is to reside on a given narrowband channel. The device may generate the discovery beacon to identify the order of narrowband channels, such that controlee devices receiving the discovery beacon can determine whether to enter into a sleep or low power mode when the controller device is on a different narrowband channel.

In some embodiments, the device may generate the discovery beacon to include a time synchronization function (TSF). In some implementations, the device may generate the discovery beacon to include both the hopping pattern and the TSF. The TSF may include a clock signal for the device, a timestamp that the device transitioned to the narrowband channel, and/or a duration that the device is to reside on the narrowband channel, or the like. The TSF may be used by other controlee device(s) to synchronize one or more clocks of the controlee device(s) according to the time synchronization function from the controller device.

At step 1008, the device may determine whether a service discovery request frame has been received. In some embodiments, the device may receive a request for at least one service to be performed (e.g., a service discovery request) between the device and another device (e.g., a second device) on the narrowband channel. The device may receive the request responsive to (or after) transitioning to the narrowband channel and/or broadcasting the discovery beacon. The device may receive the request responsive to broadcasting the discovery beacon on the narrowband channel. The device may receive the request responsive to the second device receiving, detecting, or otherwise identifying the discovery beacon broadcasted by the device on the narrowband channel.

Where the device receives a request at step 1008, the method 1000 may proceed to step 1010. At step 1010, the device may send a service discovery response frame. In some embodiments, the device may transmit, communicate, provide, or otherwise send the response frame in response to receiving the request. The device may send the response frame to the controlee device on the same narrowband channel in which the request was received from the controlee device, and/or in which the discovery beacon was broadcasted. In some embodiments, the device may send the response frame after transitioning to a different channel and returning to that same narrowband channel (e.g., following/after transitioning/hopping to each of the other narrowband channels). For example, the device may maintain the response frame in a queue, if the device did not send the response frame prior to transitioning to a different narrowband channel. Upon returning to the narrowband channel, the device may send the response frame from the queue, to the controlee device.

The device may parse the request frame from the controlee device to generate the response frame. The request frame may include a listing or identification of services which are requested to be performed between the controller and controlee devices, along with related information/requests (such as minimum/maximum data Service round interval, minimum/maximum data service round duration, minimum/maximum ranging service round interval, and/or minimum/maximum ranging service round duration). Multiple pairs of request and response frames can be exchanged between the controller device and a controlee device. The device may determine, select, or otherwise establish responses to the requests based on, for instance, capacity or capabilities of the device, availability of the device, support for or availability of one or more services, and so forth. The device may generate the response frame to include acceptance(s), modification(s), and/or rejection(s) of the requested service(s). For example, if the request from the controlee device requests a ranging service at a frequency of one ranging round every 10 ms, the controller device may accept the service (e.g., outright), reject the service (e.g., outright), or modify the requested service (e.g., accept the ranging service but modify the frequency of the ranging rounds).

In some embodiments, the device may generate the response frame to identify channel(s) on which to perform the service(s). For example, the device may generate the response frame to identify a particular channel on which the devices are to perform ranging measurements, data communications, etc. In some instances, the channels for one or more services may be separate from the narrowband channels used for device discovery. For instance, the narrowband channels used for device discovery may be dedicated to device discovery, whereas other narrowband channels may be used for data communication and/or ranging. In some instances, some service(s) may be performed on the narrowband channels that are also used for device discovery. For instance, where a request identifies data communication as a requested service, the device may select a narrowband channel used for device discovery to be also used for data communication, depending on data rates from the request. For example, if the request identifies low data rate requirements, the device may select a narrowband channel that is also used for device discovery to perform the data communications. On the other hand, if the request identifies high data rate requirements, the device may select a different narrowband channel to perform the data communications. In some embodiments, different channels may be used for different services. For example, the device may select a first channel to be used for data communications, and a second channel to be used for ranging. The device may identify such channels in the response frame. Additionally or alternatively, the device may select the same channel which is to be used both for data communications and ranging.

In some embodiments, the device may indicate, identify, or otherwise define a time or duration to perform the service(s) between the device(s). The device may identify the time/duration to the second device in the response frame. The device may identify the time/duration in a manner similar to the device identifying the hopping pattern or sequence to the second device. The controlee device(s), upon receiving the time or duration to perform the service(s) between the devices, may enter into or otherwise operate in a sleep or low power mode over a period of time, prior to the time or duration to perform the at least one service.

Where the device does not receive a service discovery request frame (at step 1008), the method 1000 may proceed to step 1012, where the device determines whether to transition to a different narrowband channel (e.g., a second or subsequent narrowband channel). The device may determine to transition to a different narrowband channel after expiration of a duration as set forth/provided in the hopping sequence/pattern. However, if the device determines not to transition to a different narrowband channel (e.g., the duration has not yet expired), the method 1000 may return back to step 1006, where the device broadcasts another discovery beacon. In other words, the device may broadcast any number of discovery beacons on a given narrowband channel within one interval of the hopping sequence. If the device determines to transition to the different narrowband channel, the method 1000 may return back to step 1004, where the device transitions to a different narrowband channel. The method 1000 may loop between steps 1004-1012 until the device transitions to each of the narrowband channels within the group of defined narrowband channels used for device discovery. Upon transitioning to each of the narrowband channels, when the method 1000 returns back to step 1004, the device may transition back to the original (e.g., first) narrowband channel.

Figure 11:
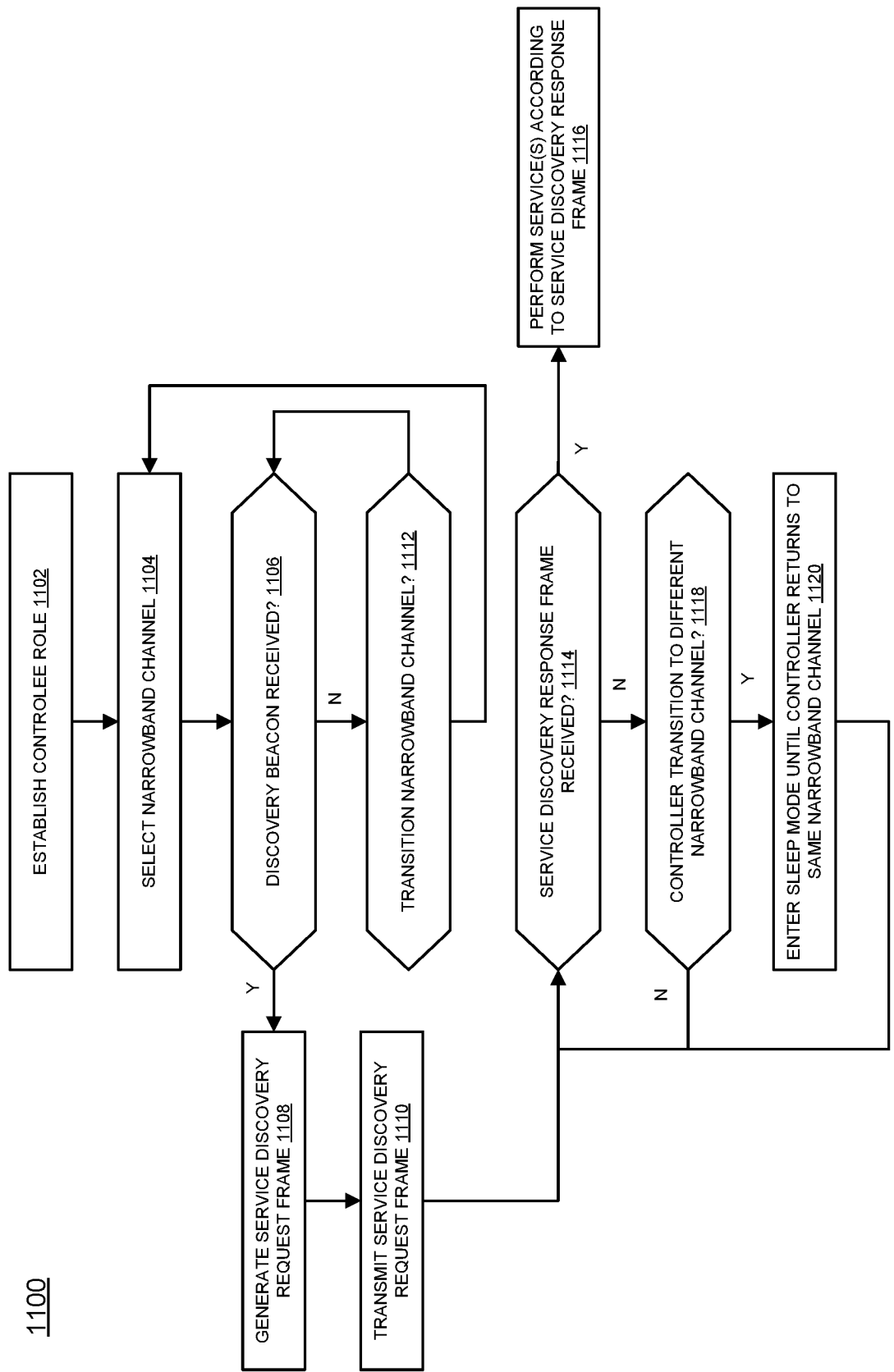
FIG. 11 is a flowchart showing a method 1000 of narrowband discovery for controlee devices, according to an example implementation of the present disclosure.

Referring now to FIG. 11, depicted is a flowchart showing a method 1100 of narrowband discovery for controlee devices, according to an example implementation of the present disclosure. The method 1100 shown in FIG. 11 may be performed by the devices, components, elements, or hardware described above with reference to FIG. 1-FIG. 9. As a brief overview, at step 1102, a device may establish its role as a controlee. At step 1104, the device may select a narrowband channel. At step 1106, the device may determine whether a discovery beacon is received. At step 1108, the device may determine whether to transition to a different narrowband channel. At step 1110, the device may generate a service discovery request frame. At step 1112, the device may transmit the service discovery request frame. At step 1114, the device may determine whether a service discovery response frame has been received. At step 1116, the device may determine whether the controller has transitioned to a different narrowband channel. At step 1118, the device may enter a sleep mode until the controller returns to the same narrowband channel. At 1120, the device may perform service(s) according to the service discovery response frame. In some embodiments, there may be more or fewer steps, and/or the order of the steps may be different At step 1102, a device may establish its role as a controlee. Step 1102 may be similar in some aspects to step 1002 described above with reference to FIG. 10. At step 1104, the device may select a narrowband channel. In some embodiments, the device may select a narrowband channel from a plurality of narrowband channels on which to listen/monitor/detect for broadcasted discovery beacons from controller devices. The device may select the narrowband channel based on a pre-configuration, at random, according to a round-robin selection, based on detected interference or occupancy from other controlee devices, etc.

At step 1106, the device may determine whether a discovery beacon is received. The device may detect/sense/receive a discovery beacon responsive to the controller device transitioning to the narrowband channel (e.g., step 1004 of FIG. 10) and broadcasting the discovery beacon (e.g., step 1006 of FIG. 10). If the device does not receive a discovery beacon, the method 1100 may proceed to step 1108. At step 1108, the device may determine whether to transition to a different narrowband channel. For example, the device may listen to a given narrowband channel for a predetermined duration (e.g., one second, two seconds, five seconds, 10 seconds, 30 seconds, etc.). If the device does not identify or receive a discovery beacon within the predetermined duration, the method 1100 may loop back to step 1104, where the device selects a different narrowband channel. Where the device detects or otherwise receives a discovery beacon, the method 1100 may proceed to step 1110.

At step 1110, the device may generate a service discovery request frame, e.g., in response to a discovery beacon. The device may generate the request frame to identify one or more services requested to be performed between the device and the controller device. The device may identify the one or more services based on a particular application executing on the device. For example, some applications may involve exchange of data between the controller and controlee devices, whereas other applications may involve ranging and data communications between the controller and controlees. In some embodiments, the device may identify the one or more services based on capabilities of the device. For example, the device may determine that it is not capable of performing data communications, and is only configured for ranging. As such, the device may only request a ranging service that the device can support or participate in. In some embodiments, the device may request a service from a controller device that the device itself cannot provide (e.g., but that the device needs). Additionally, the device may generate the request frame to specify various characteristics of the requested services (e.g., minimum/maximum data service round interval, minimum/maximum data service round duration, minimum/maximum ranging service round interval, and/or minimum/maximum ranging service round duration). The characteristics may be defined or determined in a manner similar to determining the services requested.

At step 1112, the device may transmit the service discovery request frame. In some embodiments, the device may transmit the request frame to the controller which broadcasts the discovery beacon. In some embodiments, the device may transmit the request frame on the narrowband channel in which the device received the discovery beacon from the controller. The device may transmit the request frame, to request one or more services to be performed by the controller and/or one or more controlee devices. In some embodiments, the device may determine whether to transmit the request frame to the controller. For example, the device may determine whether to transmit the request frame to the controller based on data included/advertised in the discovery beacon. As stated above with reference to FIG. 10, the discovery beacon may include data corresponding to a hopping sequence and/or duration in which the controller device is on a particular narrowband channel. If the device determines that the controller device is no longer present on the same narrowband channel, the device may queue (or hold off) the request frame until a subsequent point in time in which the controller device returns to the same narrowband channel (e.g., according to the hopping sequence provided in the discovery beacon).

At step 1114, the device may determine whether a service discovery response frame has been received. In some embodiments, the device may determine whether the response is received, responsive to transmitting the service discovery request frame at step 1112. The device may determine whether the response is received, by monitoring the narrowband channel for any responses. If the response has not been received, the method 1100 may proceed to step 1116. At step 1116, the device may determine whether the controller has transitioned to a different narrowband channel. The device may determine whether the controller has transitioned to a different narrowband channel using the hopping pattern or sequence provided in the discovery beacon. As noted above, the controller device may transmit, in the discovery beacon, a time synchronization function (TSF). The device may receive the discovery beacon and synchronize a clock of the device according to the TSF from the controller device. Once the clock is synchronized and the hopping sequence is determined by the device, the device may determine when the controller device is to switch to a different narrowband channel. The method 1100 may loop between steps 1114 and 1116 until the response frame is received or the device determines that the controller device has switched to a different narrowband channel. At step 1118, when the device determines that the controller device has switched to a different narrowband channel (e.g., according to the hopping schedule/pattern), the device may enter a sleep or low power mode until the controller returns to the same narrowband channel. When the controller device is to return to the same narrowband channel (e.g., as the device), the device may awake or enter into a normal power mode, to listen/monitor for the service discovery response frame.

At 1120, when the device receives the service discovery response frame, the device may perform further negotiation (e.g., via sending one or more service discovery requests and/or receiving one or more service discovery response frames), and/or initiate/perform the service(s) according to the negotiation(s) (e.g., service parameters indicated in a service discovery response frame). The service discovery response frame, as noted above with reference to step 1010 of FIG. 10, may include acceptance(s), modification(s), and/or rejection(s) of service(s) and characteristics/parameters for performing the service(s). The device may receive the response frame and determine whether to perform the service(s) and/or whether the characteristic(s) or parameter(s) of the service(s) are acceptable. If acceptable, the device may perform the service(s) according to the service discovery response frame. However, if the device determines that the rejected service(s) or modification(s) to the service(s)/parameters are unacceptable, the device may search for a different controller device (e.g., by restarting the method 1100) in the same narrowband channel or a different narrowband channel.

Figure 12:
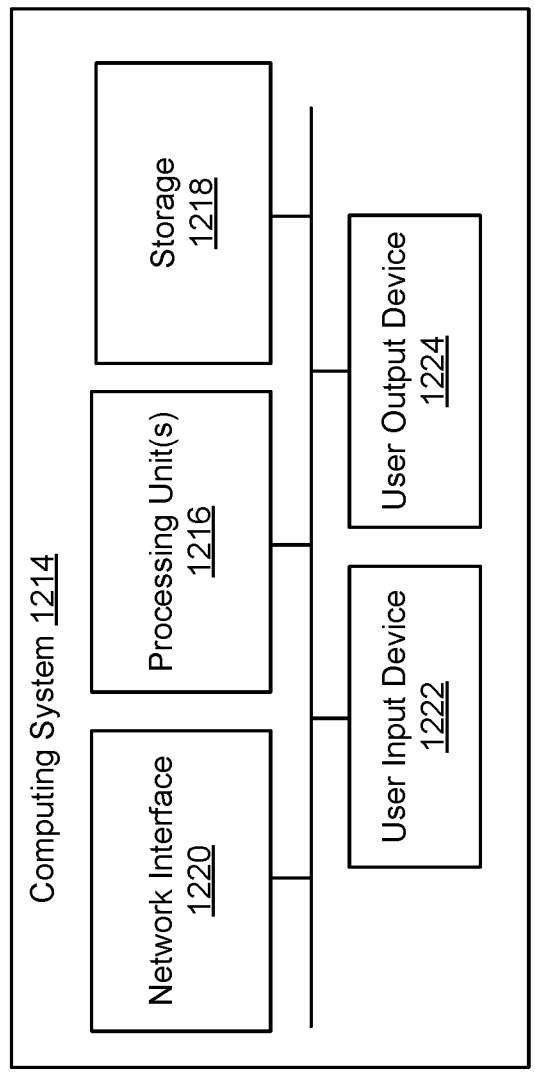
FIG. 12 is a block diagram of a computing environment, according to an example implementation of the present disclosure.

Various operations described herein can be implemented on computer systems. FIG. 12 shows a block diagram of a representative computing system 1214 usable to implement the present disclosure. In some embodiments, the computing device 110, the HWD 150, devices 302, 304, or each of the components describe above with reference to FIG. 1-11 are implemented by or may otherwise include one or more components of the computing system 1214. Computing system 1214 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 1214 can be implemented to provide VR, AR, MR experience. In some embodiments, the computing system 1214 can include conventional computer components such as processors 1216, storage device 1218, network interface 1220, user input device 1222, and user output device 1224.

Network interface 1220 can provide a connection to a wide area network (e.g., the Internet) to which WAN interface of a remote server system is also connected. Network interface 1220 can include a wired interface (e.g., Ethernet) and/or a wireless interface implementing various RF data communication standards such as Wi-Fi, Bluetooth, UWB, or cellular data network standards (e.g., 3G, 4G, 5G, 60 GHz, LTE, etc.).

User input device 1222 can include any device (or devices) via which a user can provide signals to computing system 1214; computing system 1214 can interpret the signals as indicative of particular user requests or information. User input device 1222 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 1224 can include any device via which computing system 1214 can provide information to a user. For example, user output device 1224 can include a display to display images generated by or delivered to computing system 1214. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 1224 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 1216 can provide various functionality for computing system 1214, including any of the functionality described herein as being performed by a server or client, or other functionality associated with message management services.

It will be appreciated that computing system 1214 is illustrative and that variations and modifications are possible. Computer systems used in connection with the present disclosure can have other capabilities not specifically described here. Further, while computing system 1214 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and B' can include only 'A', only B', as well as both 'A' and B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
transitioning, by a first ultra-wideband (UWB) device, from a first narrowband channel to a second narrowband channel of a plurality of defined narrowband channels, to broadcast a discovery beacon for receipt by one or more UWB devices;
receiving, by the first UWB device from a second UWB device, in the second narrowband channel, a request for a ranging operation to be performed between the first UWB device and the second UWB device; and
sending, by the first UWB device to the second UWB device in response to the request, a response frame indicating an acceptance, modification, or rejection of the request for the ranging operation.

2. The method of claim 1, comprising:
broadcasting, by the first UWB device, the discovery beacon after transitioning to the second narrowband channel; and
receiving, by the first UWB device from the second UWB device, the request in response to the second UWB device detecting the discovery beacon in the second narrowband channel.

3. The method of claim 2, wherein the discovery beacon comprises a time synchronization field, and wherein the second UWB device synchronizes one or more clocks of the second UWB device according to the time synchronization field.

4. The method of claim 1, wherein the response frame includes a field indicating at least one of: the acceptance, the modification, or the rejection of the request for the ranging operation.

5. The method of claim 1, wherein at least one of: the request or the response frame comprise an indication of one or more channels for performing the ranging operation between the first UWB device and the second UWB device.

6. The method of claim 1, comprising:
establishing, by the first UWB device, at least one of: a controller role for the first UWB device, or a controlee role for the second UWB device.

7. The method of claim 1, comprising:
indicating, by the first UWB device in the response frame, a time or duration to perform the ranging operation; and
causing, via the response frame, the second UWB device to operate in a sleep or low power mode over a period of time, prior to the time or duration to perform the ranging operation.

8. A first ultra-wideband (UWB) device comprising:
at least one processor configured to:
transition the first UWB device from a first narrowband channel to a second narrowband channel of a plurality of defined narrowband channels, to broadcast a discovery beacon for receipt by one or more UWB devices;
receive, via a transceiver from a second UWB device, in the second narrowband channel, a request for a ranging operation to be performed between the first UWB device and the second UWB device; and
send, via the transceiver to the second UWB device in response to the request, a response frame indicating an acceptance, modification, or rejection of the request for the ranging operation.

9. The first UWB device of claim 8, wherein the at least one processor is configured to:
broadcast, via the transceiver, the discovery beacon after transitioning to the second narrowband channel; and
receive, via the transceiver from the second UWB device, the request in response to the second UWB device detecting the discovery beacon in the second narrowband channel.

10. The first UWB device of claim 9, wherein the discovery beacon comprises a time synchronization field, and wherein the second UWB device synchronizes one or more clocks of the second UWB device according to the time synchronization field.

11. The first UWB device of claim 8, wherein the response frame includes a field indicating at least one of: the acceptance, the modification, or the rejection of the request for the ranging operation.

12. The first UWB device of claim 8, wherein the at least one processor is configured to:
establish at least one of: a controller role for the first UWB device, or a controlee role for the second UWB device.

13. The first UWB device of claim 8, wherein the at least one processor is configured to:
indicate, in the response frame, a time or duration to perform the ranging operation; and
cause, via a response frame, the second UWB device to operate in a sleep or low power mode over a period of time, prior to the time or duration to perform the ranging operation.

14. The first UWB device of claim 8, wherein at least one of the request or the response frame comprise an indication of one or more channels for performing the ranging operation between the first UWB device and the second UWB device.

15. The non-transitory computer readable medium of claim 14, wherein the instructions further cause the one or more processors to:
broadcast the discovery beacon after transitioning to the second narrowband channel; and
receive, from the second UWB device, the request in response to the second UWB device detecting the discovery beacon in the second narrowband channel.

16. The non-transitory computer readable medium of claim 14, wherein the discovery beacon comprises a time synchronization field, and wherein the second UWB device synchronizes one or more clocks of the second UWB device according to the time synchronization field.

17. The non-transitory computer readable medium of claim 14, wherein the response frame includes a field indicating at least one of: the acceptance, the modification, or the rejection of the request for the ranging operation.

18. The non-transitory computer readable medium of claim 14, wherein at least one of: the request or the response frame comprise an indication of one or more channels for performing the ranging operation between the first UWB device and the second UWB device.

19. The non-transitory computer readable medium of claim 14, wherein the instructions further cause the one or more processors to establish at least one of a controller role for the first UWB device, or a controlee role for the second UWB device.

20. A non-transitory computer readable medium storing instructions that, when executed by one or more processors of a first ultra-wideband (UWB) device, cause the one or more processors to:
transition the first UWB device from a first narrowband channel to a second narrowband channel of a plurality of defined narrowband channels, to broadcast a discovery beacon for receipt by one or more UWB devices;
receive, via a transceiver from a second UWB device, in the second narrowband channel, a request for a ranging operation to be performed between the first UWB device and the second UWB device; and
send, via the transceiver to the second UWB device in response to the request, a response frame indicating an acceptance, modification, or rejection of the request for the ranging operation.

* * * * *